United States Patent
Goldstein et al.

(10) Patent No.: US 7,062,261 B2
(45) Date of Patent: Jun. 13, 2006

(54) METHOD AND APPARATUS FOR AUTOMATIC DETECTION AND INSTALLATION OF JAVA-ENABLED ACCESSORIES

(75) Inventors: Shimon Goldstein, Coral Springs, FL (US); Ricardo Martinez, Plantation, FL (US); Dominik Buszko, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 117 days.

(21) Appl. No.: 10/355,909

(22) Filed: Jan. 31, 2003

(65) Prior Publication Data

US 2004/0152457 A1  Aug. 5, 2004

(51) Int. Cl.
*H04M 3/00* (2006.01)
(52) U.S. Cl. .................. 455/419; 455/557; 709/229
(58) Field of Classification Search ............. 455/418, 455/419, 420, 66.1, 41.1, 517, 41.2, 557, 455/414.1, 414.2, 414.3, 414.4, 556.1, 556.2; 709/226, 229; 718/105
See application file for complete search history.

(56) References Cited

U.S. PATENT DOCUMENTS

| 6,393,104 B1* | 5/2002 | Akhteruzzaman et al. .. 379/379 |
| 6,453,127 B1* | 9/2002 | Wood et al. ................. 399/399 |
| 6,473,854 B1* | 10/2002 | Fleming, III ................... 713/1 |
| 6,725,061 B1* | 4/2004 | Hutchison et al. .......... 455/557 |
| 6,862,737 B1* | 3/2005 | Iwamura et al. ............ 719/321 |
| 2003/0073412 A1* | 4/2003 | Meade II ..................... 455/70 |
| 2003/0114106 A1* | 6/2003 | Miyatsu et al. .............. 455/41 |
| 2005/0014531 A1 | 1/2005 | Findikli ....................... 455/557 |
| 2005/0022212 A1* | 1/2005 | Bowen ........................ 719/321 |

* cited by examiner

*Primary Examiner*—Charles Appiah

(57) ABSTRACT

A wireless communication device 100, peripheral accessories 104, 108, and corresponding methods are arranged and constructed to automatically operate the peripheral accessories 104, 108 by communicating network information to the wireless communication device so the device may locate and download, via a network 116, operating programs for use with the accessories.

7 Claims, 4 Drawing Sheets

METHOD AND APPARATUS FOR AUTOMATIC DETECTION AND INSTALLATION OF JAVA-ENABLED ACCESSORIES

FIELD OF THE INVENTION

This invention relates in general to wireless communication devices and accessories thereof, and more specifically methods and apparatus for automatically detecting an accessory and enabling operation thereof.

BACKGROUND OF THE INVENTION

It is known to have a peripheral accessory detected by a computer and have the computer select, based on accessory type and when available, the appropriate driver to communicate with the accessory. This works provided, the computer knows the function of the accessory a priori and one or more application programs used by the computer has generic knowledge of the function of the accessory. For example, upon connecting a printer to a typical computer, the computer will discover the new hardware or accessory, understand from hardware type information that it is a printer and select, when available, an appropriate driver for that device from user supplied media or from drivers included with the basic operating system. The driver translates generic printing commands from, for example a word processor, to commands specific to that make and model of printer. A similar process takes place for other peripheral devices such as scanners, fax machines, memory cards, keyboards, etc.

In those cases, when the computer does not have prior knowledge corresponding to the type of accessory being attached and access to the proper driver basic capabilities of that accessory, the accessory will not be able to operate appropriately. This places an undesirable limitation on those who develop, sell and use new accessories that were not contemplated when the computer or other host device, such as a wireless communication device, was built or application program developed.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

Figure 1:
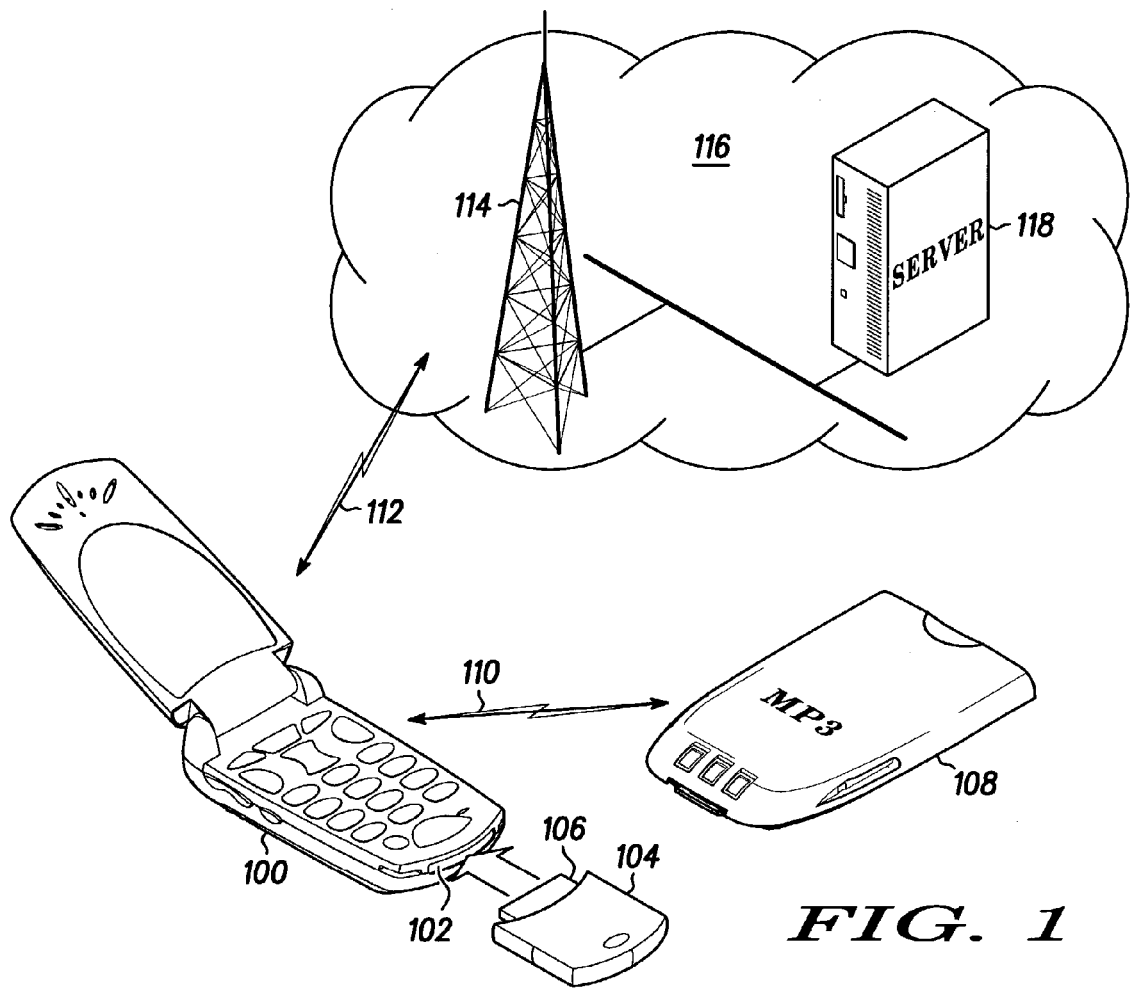
FIG. 1 depicts, in a simplified and representative form, a system overview of an wireless communications device, peripheral accessories and a wireless network.

In overview, the present disclosure concerns wireless communications devices and peripheral accessories that may be associated with wireless communications devices, such as cameras, barcode readers, portable printers, MP3 music players, Global Positioning System (GPS) receivers, expanded keyboards, hands-free accessories, personal digital assistants (PDA) and the like. More particularly, various inventive concepts and principles embodied in methods and apparatus for the participation of these accessories in acquiring appropriately versioned software in their host wireless devices are discussed. The wireless devices of particular interest are those that rely on or utilize a programming language to provide an environment where software is easy to develop and resultant code or software is highly portable. Such programming languages include, for example but not limited to, Java™, kJava™, pJava™ and J2ME™, all trademarks of Sun Microsystems or evolutions thereof or like languages with similar or analogous properties.

As further discussed below, various inventive principles and combinations thereof are advantageously employed to essentially allow the peripheral to be responsible for or initiate and facilitate major aspects of its own installation process. It may not be economically feasible for a peripheral accessory to carry within its own memory all versions of software programs such as driver programs and application programs required by the myriad of different host devices or wireless communication devices to which it may be connected. As an alternative to that costly implementation, the peripheral accessory need only carry references to where the correct operating program may be found thereby allowing a network-based resource to be accessed to retrieve the correct information or software program for a given, brand and model, wireless communication device. When the peripheral accessory is attached or coupled to a new wireless communication device, the peripheral accessory can communicate with the wireless communication device and send information relative to its own operation. For example, the peripheral accessory can communicate information to be used by the wireless communication device in locating, downloading or activating an application or driver program to be used for operating the peripheral accessory. Examples of such information include: a program name, a common name of the accessory for display to the user, and a URL or IP address of a location or network location where the program can be found.

This allows the entity responsible for selling and maintaining the peripheral accessory to have control of the functions supported and the software version required for a specific manufacturer's wireless communication device. Unlike existing PC implementations of accessory recognition, the instant invention advantageously does not require pre-registration with vendors of operating systems for wireless communication devices nor does it require prior knowledge of the functional capabilities of the accessory to be included with the wireless device.

The instant disclosure is provided to further explain in an enabling fashion the best mode of making and using the various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents to those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance with the present invention, further discussion of such software and ICs, if any, will be limited to the essentials with respect to the principles and concepts of the preferred embodiments.

Referring to FIG. 1, an exemplary system diagram of a wireless communications device, peripheral accessories, and a wireless network will be discussed and described. The wireless communications device may be a cellular handset, personal digital assistant, messaging device, personal computer or the like device having wireless communications functionality. The accessories 104, 108 may communicate with the wireless communication device via a wired connection, via for example connectors 102, 106, between the wireless device 100 and the peripheral accessory 104 as shown. Alternatively the accessories 104, 108 may communicate with the wireless communication device using a wireless connection 110, for example, a short range wireless connection using Bluetooth or IEEE 802.11 (WiFi) between the wireless device 100 and the peripheral accessory 108, again as shown.

The wireless communications device 100 is further connected to a radio access network 114 and thus to a network 116 by a wireless communications connection 112. The network 116 may be a Wide Area Network (WAN), a Local Area Network (LAN), or combination of both. The network 116 provides the wireless communications device 100 with access to one or more computer servers 118 or like equipment capable of storing and downloading program files. The wireless communications connection 112 would typically be that associated with WAN functions or services such as voice, data, video, or the like using, for example, time division multiple access (TDMA) or code division multiple access (CDMA) technologies. However, the wireless communications connection 112 may also be a Local Area Network typically associated with short range communication such as Bluetooth or IEEE 802.11. The computer server 118 stores and is able to distribute, upon request, via the network 116, the radio access network 114, and the wireless communications connection 112, software programs, such as application or driver programs that run on the wireless communication device 100 to operate or facilitate operation of the peripheral accessory 104, 108.

Figure 2:
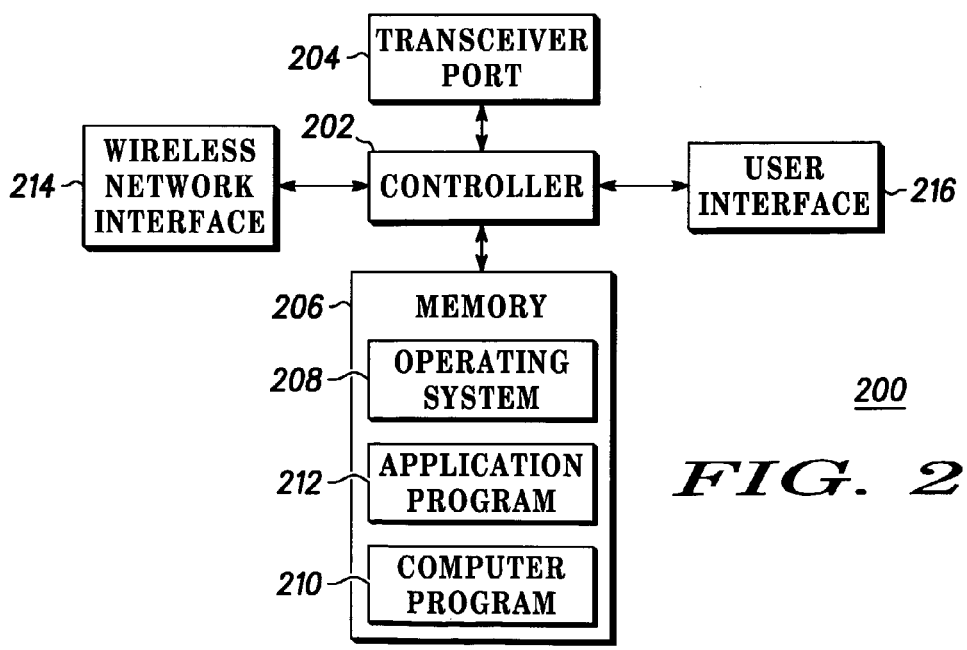
FIG. 2 depicts a block diagram of a wireless communications device.

Referring to FIG. 2, a block diagram of an exemplary wireless communication device 200 will be discussed and described. The wireless communication device is arranged and constructed to automatically operate Java-enabled accessories and comprises, a controller 202, a port 204 for coupling to a peripheral accessory 104 and enabled for bi-directional communication, a wireless network interface 214, a user interface 216, and a memory 206 all inter coupled as shown. The general underlying functionality or utility and construction of these blocks are known. For example, the wireless network interface will include one or more radio frequency transceivers that are controlled by a microprocessor and possibly digital signal processor based controller 202 to establish and maintain radio communications links 110, 112 as appropriate. The memory 206 may be comprised of RAM, ROM, etc. and will be used to store an operating system 208, other computer programs 210 as will be appreciated by one of ordinary skill as well as software programs, such as application programs cross referenced by names 212 as will be further described. Therefore further detailed description for the functional blocks will not be undertaken except to the extent of modifications in structure or operation is indicated given the concepts and principles disclosed herein.

The bi-directional communication may be one of several available in the industry including, but not limited to a serial bus, a Universal Serial Bus, Bluetooth, an IEEE 802.11 wireless network, an IEEE 1394 network (Firewire) or an Infrared Data Association (IRDA) protocol. The methods required by such protocols may require one or more setup messages to be passed to establish effective communications before substantive messages occur between the wireless communication device 200 and the peripheral accessory 104, 108. In one example, the communication may be via a serial bus connection at, preferably, a transfer rate of 19,200 baud following the TIA/EIA-602 format also known as the Hayes AT command set. An initial message is received from the peripheral accessory via the transceiver port 204 for example, a command "AT&JAVA", the purpose of which is to determine if the wireless communication device 200 is able to automatically locate and operate Java-enabled accessories. If the wireless communication device 200 is so enabled to support Java-enabled accessories, the controller 202 responds via the transceiver port 204 with a message indicating the affirmative, such as "OK."

If the wireless communication device 200 is not so enabled to support Java-enabled accessories, the controller 202 responds via the transceiver port 204 with a message indicating the negative, such as "ERROR." In the case where a wireless communication device 200 is so enabled, the peripheral accessory 104 will send a first substantive communication message with information that the wireless communication device can use to find and activate a program for operating the accessory, such as "AT+JAVA: MIDLET=<AccessoryName>:<RevNumber>:<MIDlet-Name>", where <AccessoryName> identifies the peripheral accessory 104, such as a common name of the accessory and <RevNumber> is the revision number for a program and <MIDletName> is an identifier corresponding to an application program or generally software program for use by the wireless communication device to operate the peripheral accessory, such as the name of a Java program or the like. The controller 202 uses the <MIDletName> identifier to search memory 206 for the availability of an application program 212 indicated by the identifier. The controller 202 communicates a message to the peripheral accessory via the transceiver port 204 comprising a message as to the availability of the program. Examples of such messages would be "OK" if the application program 212 is available, "ERROR" if the application program 212 is not in memory 206, or "BUSY" if other conditions do not allow the controller to continue to activate the application program.

In the case where the application program 212 is not available and the message exemplified by "ERROR" is sent to the peripheral accessory 104, a message will be returned via the transceiver port 204 to the controller 202 with network location information, for example, "AT+JAVA: MIDLETI=<MIDlet URL>" where <MIDlet URL> is a network information corresponding to a network location, such as the server 118, for the application program. The network information may be, but is not limited to, a Universal Resource Locator (URL), a Universal Resource Identifier (name or URI), an IP address or other network address. The controller 202 will, preferably, use the network information to obtain a copy of the application program by locating and downloading the application program 212 from the network location 118 via the wireless network interface 214 and placing it in memory 206.

When the controller 202 has access to the application program 212, either through finding it initially in the memory 206 or after downloading it, the controller 202 may present a request via the user interface 216 for permission to activate the application program 212 and subsequently the peripheral accessory 104, 108. The controller may use the peripheral accessory identifier, for example, the common name of the peripheral accessory 104 in this process. If permission is granted, the controller 202 sends a message to the peripheral accessory 104, 108 that the application program is about to be activated, for example, "OK". The controller 202 activates the application program 212, and transfers operational control and all direct communication with the peripheral accessory 104 to the application program 212. The application program 212 may also have access to the resources in the wireless communication device, such as the user interface 216 and the wireless network interface 214. As an example, the application program 212 may be a Java MIDlet constructed for operation in a kJava environment.

If the user does not want to use the peripheral accessory 104 by activating the application program 212 or if the wireless network interface 214 is not available for downloading, a message is returned by the controller 202 to the peripheral accessory indicating that the application program 212 will not be activated, for example, "BUSY".

Figure 3:
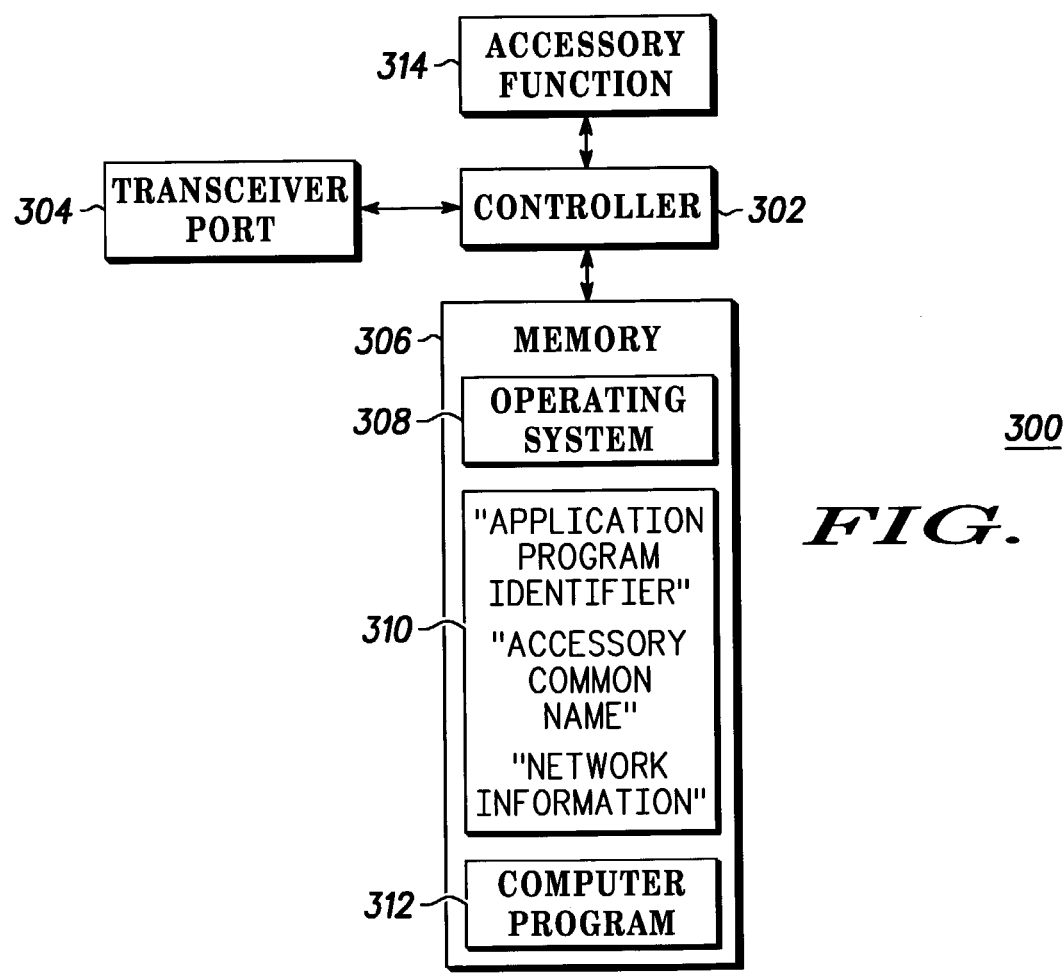
FIG. 3 depicts a block diagram of a peripheral accessory.

Referring to FIG. 3, a block diagram of an exemplary peripheral accessory 300 will be discussed and described. The peripheral accessory is arranged and constructed to automatically work with a similarly enabled wireless communication device and, comprises a controller 302 coupled to a transceiver port 304 for bi-directional communication with a wireless communication device 200, a memory 306 coupled to the controller, and an accessory function 314 coupled to the controller.

The transceiver port 304 is arranged to support a wired or wireless connection to the wireless communications device 200 via, for example known Bluetooth or IEEE 802.11 technologies. The memory 306 further comprise several elements stored therein, for example an operating system 308, a computer program 312, and various information 310 associated with the peripheral accessory 300 or operation thereof by the wireless communication device 200. For example, "Application or other software Program Identifier," "Accessory Common Name," and "Network Information" may be included. The accessory function 314 may be any one or more of a multiplicity of functions including many or all of the functions now associated with personal computers, such as printers, various modems, pointing devices such as a mouse, or the like. The accessory function 314 may include one or more of other functions that may enhance or be especially useful for complementing or extending the utility of wireless communications device such as bar code scanners, MIDI music players, CD or DVD drives, cameras, or the like.

The bi-directional communication of the transceiver port 304 may be one of several available in the industry including, but not limited to a serial bus, a Universal Serial Bus, Bluetooth, an IEEE 802.11 wireless network, an IEEE 1394 network (Firewire) or an Infrared Data Association (IRDA) protocol. The methods of such protocols may require one or more setup messages to be passed to establish effective communications before substantive messages occur or are passed between the wireless communication device 200 and the peripheral accessory 300. In one example, the communication may be via a serial bus connection at, preferably, a transfer rate of 19,200 baud following the TIA/EIA-602 format also known as the Hayes AT command set. An initial message is sent to the wireless communication device via the transceiver port 304 to determine if the wireless communication device is able to automatically locate and operate Java-enabled accessories. An example of such a message is "AT&JAVA".

If the wireless communication device is so enabled a positive response will be sent, for example, "OK." The peripheral accessory 300 will send information to be used in locating and operating the peripheral accessory 300, for example, AT+JAVA:MIDLET=<AccessoryName>: <RevNumber>:<MidletName>, where <AccessoryName> identifies the peripheral accessory 300, such as a common name of the accessory and <MIDletName> is an identifier corresponding to an application program 212 for use by the wireless communication device to operate the peripheral accessory, such as the name of a Java program or the like. The peripheral accessory 300 then stands by for an additional response from the wireless communication device 200 as to the availability of the application program 212. If there is no response after, for example three attempts, the peripheral accessory 300 shuts itself down. If the response is in the affirmative, for example, "OK" the controller 302 will wait for operating commands from the application program 212 executing on the wireless communication device 200. If the response is that the wireless communication device will not be using the peripheral accessory at this time, for example "BUSY" the controller will place the peripheral accessory 300 in a standby mode and monitor the transceiver port 304 for communication from the wireless communication device 200. If the response is that the program cannot be found in local memory 206, for example, "ERROR" the controller 202 will reply with network information 310 comprising the network location for an application program that may be retrieved and stored in the wireless device memory at 212. An example of such a message is "AT+JAVA: MIDLETI=<MIDlet URL>" where <MIDlet URL> is network information corresponding to a network location, such as the server 118 for the application program. The network information may be, but is not limited to, a universal resource locator, a universal resource identifier, or a network address. The controller 302 will then wait for a message from the wireless communication device 200. If the wireless communication device does not support over the air download or is otherwise not going to activate the application program a negative message is received, for example, "ERROR" or "BUSY." The peripheral accessory 300 will monitor the transceiver port 304 for additional communication from the wireless communication device 200. If the message is in the positive, for example, "OK," that indicates the installation process is in process on the wireless communication device 200 and the controller 302 will wait for operating commands from the wireless communication device 200.

Figure 4:
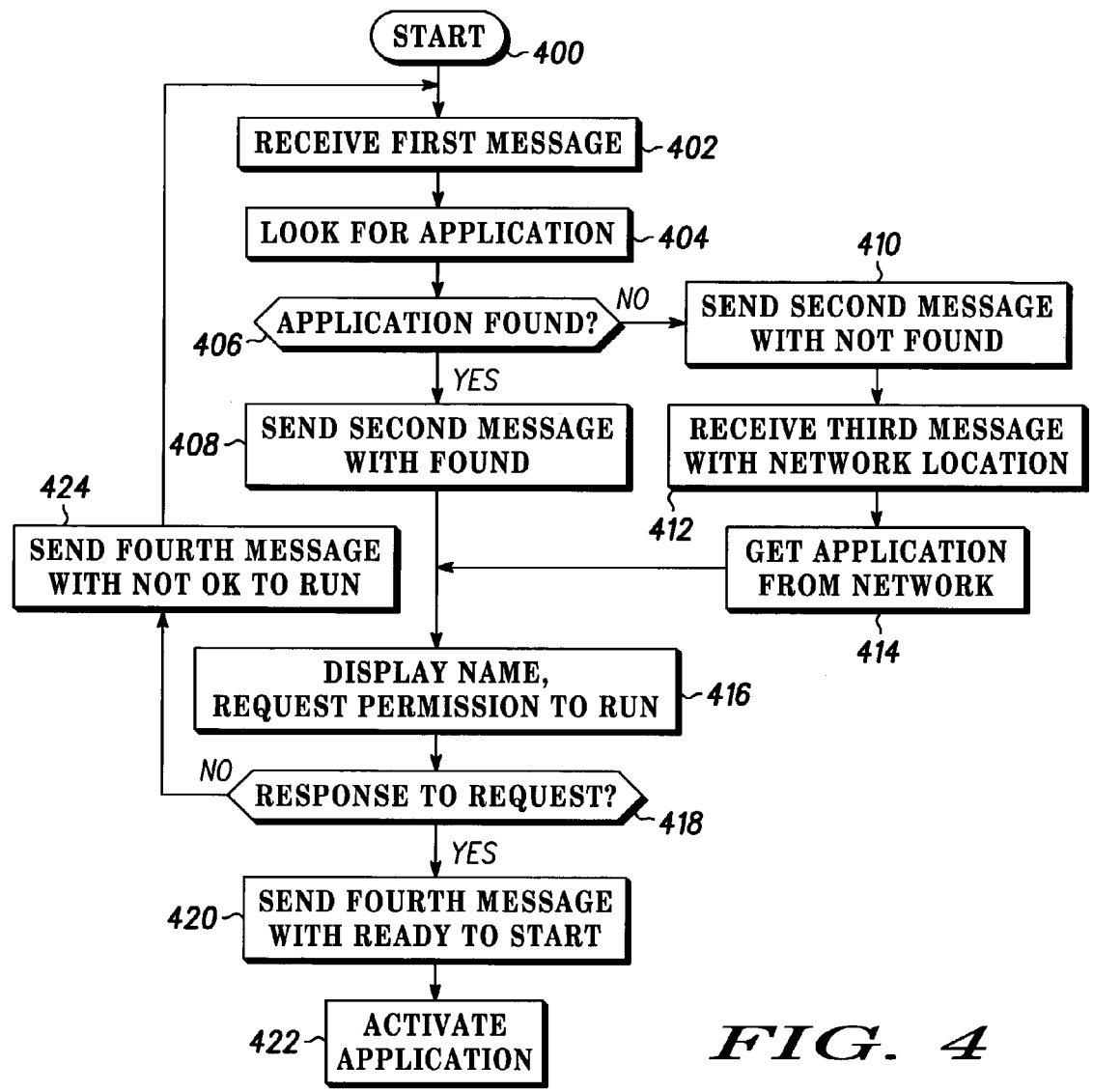
FIG. 4 depicts a flow chart of a preferred method, at a wireless communications device, of automatically locating and installing a program to operate a peripheral accessory.

Referring to FIG. 4, a flow chart of a preferred method, at a wireless communications device, of automatically locating and installing a program to operate a peripheral accessory will be discussed and described. The wireless communication device 200 establishes a communication 400 with the peripheral accessory 300 and further accepts a first communication message 402 from the peripheral accessory 300, the first communication message comprising an identifier for an application program for use by the wireless communication device 200 to operate the peripheral accessory 300. The controller 202 of the wireless communication device 200 then checks to see whether the application program is available 404 within the memory 206 at application program 212 location. If the controller 202 determines that the application program is available at 406 the Yes branch is followed and a message or second message confirming availability is sent 408 to the peripheral accessory 300.

If the controller 202 determines that the application is not available at 406, the No branch is followed and at 410, a second communication message comprising an indication that the application program is not available in the wireless communication device is sent to the peripheral accessory 300. Next at 412, the controller 202 receives a third message from the peripheral accessory 300, the third message comprising network information 310 corresponding to a network location of the application program. The wireless communication device then locates and downloads the application program at 414 via the network 116 from the network location, such as the server 118.

The wireless communication device now having access to the application program, either by finding it in memory or downloading, may display 416 a common name of the peripheral accessory on a user interface along with a request to start the application program. Upon receiving a response from the user interface to the request to start the application program the controller 202 determines at 418 whether a positive or negative response was received. When the response is positive at 418 the Yes branch is followed to 420 where the controller 202 sends a fourth message to the peripheral accessory, the fourth message further comprising a notification that the application program is started or about to be started. The controller then activates the application program to operate the peripheral accessory at 422. When the response is negative at 418 the No branch is followed and at 424 the controller sends a fourth communication message to the peripheral accessory, the fourth message further comprising a notification that the wireless communication device will not activate the application program.

Figure 5:
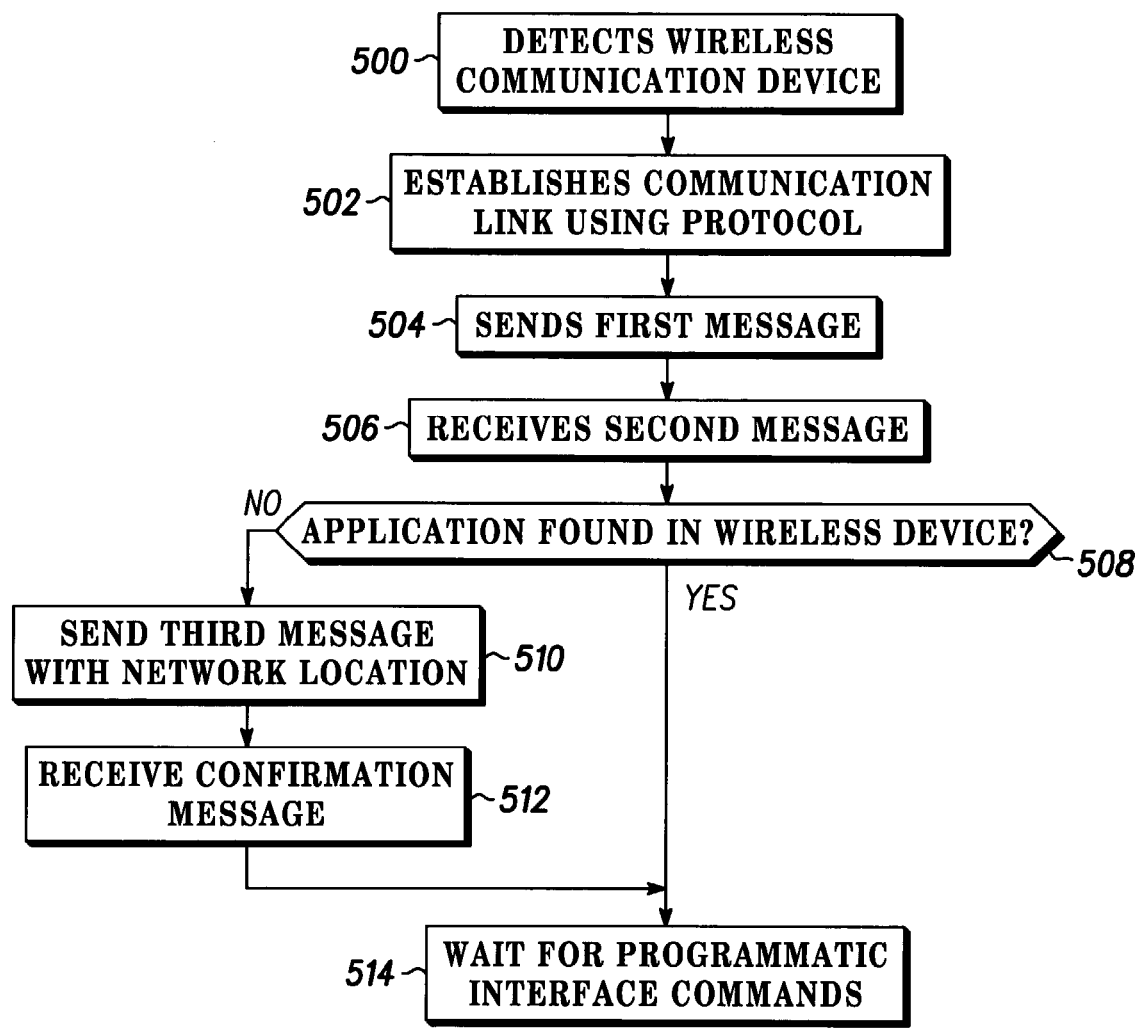
FIG. 5 depicts a flow chart of a preferred method, at a peripheral accessory, to facilitate operation of the peripheral accessory.

Referring to FIG. 5, a flow chart of a preferred method, at a peripheral accessory, to facilitate operation of the peripheral accessory will be discussed and described. The peripheral accessory 300 detects at 500 the presence of the wireless communication device, establishes a communication 502, and then sends a first communication message at 504 to the wireless communication device 200. The first communication message comprises an identifier for a software program, such as an application or driver program for use by the wireless communication device 200 to operate the peripheral accessory 300. The controller 202 of the wireless communication device 200 determines whether the application program is available as discussed with reference to FIG. 4, 404, 406 provides at 506 a second communication message to the peripheral accessory 200, the second communication message further indicating the availability of the application program. The controller 302 in the peripheral accessory 300 analyzes 508 the second message to determine if the application program was found in the wireless communication device 200. If at 508 the application program is present in the wireless communication device 200 and the user has approved use of the peripheral accessory the Yes branch is followed and at 514 the controller 302 of the peripheral accessory 300 will wait for operational commands from the wireless communication device.

If at 508 the application program was not found in the wireless communication device 200, the No branch is followed and at 510 the controller 302 of the peripheral accessory will send a third message to the wireless communication device 200, the third message comprising network information 310 corresponding to a network location of the application program. At 512 the controller 302 of the peripheral accessory 300 will receive a fourth message from the wireless communication device, the fourth message comprising a notification when or if the application program is started. If the application program is present in the wireless communication device 200 and the user has approved use of the peripheral accessory, the process moves to 514 where the controller 302 of the peripheral accessory 300 will wait for operational commands from the wireless communication device. If the messages associated with steps 506 or 512 are determined to contain instructions that the wireless communication device 200 is not ready to operate the peripheral accessory 300, the peripheral accessory will wait for operational commands from the wireless communication device 200 at a reduced power level or in a standby mode.

The processes and apparatus discussed above, and the inventive principles and concepts thereof are intended to and may alleviate problems caused by prior art peripheral accessory installation and operation. Using these principles of carrying names and network location references rather than actual operating programs greatly increases portability of accessories, prolongs their life and provides a more user-friendly environment to general audiences.

A user of a wireless communication device must no longer be burdened by manually addressing a web or Wireless Application Protocol (WAP) site over the air to find and download an application to support a specific peripheral accessory. Similarly, the user is not required to connect his or her wireless device to a computer via a wired connection and download an application program to operate the accessory using software on media supplied with the accessory and thus incur a delay from the time of purchase to when the accessory is operational.

Various embodiments of methods, and apparatus for automatically operating Java-enabled accessories so as to facilitate and provide for adding new peripheral accessory devices to a wireless communication device in an efficient and timely manner have been discussed and described. While Java is the current programming language of choice, and recommended in the preferred embodiment, it is likely that other programming and operating environments will emerge that will be suitable for using the distinguishing features of this invention. It is expected that these embodiments or others in accordance with the present invention will have application to many environments that provide for automatic configuration and reconfiguration of resource limited accessories.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in a wireless communication device to automatically install a Java-enabled peripheral accessory, comprising the steps of:
    accepting a first communication message from a peripheral accessory, said first communication message comprising an identifier for an application program for use by the wireless communication device to operate the peripheral accessory, and to enable the wireless communication device to determine if the application program must be acquired from a network location; and
    determining the application program is not available in the wireless communication device; and
    providing a second communication message to the peripheral accessory, the second communication message indicating the application program is not available in the wireless communication device;
    receiving a third message from the peripheral accessory, the third message comprising network information corresponding to the network location of the application program; and
    obtaining the application program from the network location.

2. The method of claim 1 further comprising;
    displaying on a user interface a common name of the peripheral accessory and a request to start the application program; and
    receiving a response from the user interface to said request to start the application program.

3. The method of claim 2 when said response to the request to start the application program is positive further comprising;
    sending a fourth message to the peripheral accessory, said fourth message further comprising a notification that the application program is to be started; and
    activating the application program to operate the peripheral accessory.

4. The method of claim 3 when said response to the request to start the application is negative further comprising;
    sending a fourth communication message to the peripheral accessory, said fourth message further comprising a notification that the wireless communication device will not activate the application program.

5. The method of claim 1 wherein accepting the first message, providing the second message, and receiving the third message arc performed using a communication protocol which is one of a serial bus, a Universal Serial Bus, Bluetooth, an IEEE 802.11, an IEEE 1394 and an Infrared Data Association protocol.

6. The method of claim 1, wherein determining that the application program is not available includes searching a memory of the wireless communication device for the identifier.

7. The method of claim 1, wherein receiving the third message comprises receiving one of a universal resource locator, a universal resource identifier, and a network address.

* * * * *